United States Patent [19]

Threatt

[11] Patent Number: 4,961,681

[45] Date of Patent: Oct. 9, 1990

[54] CHUCK FOR ATTACHING UTILITY VEHICLE ACCESSORIES

[76] Inventor: Raymond W. Threatt, 500 Woodland Dr., No. 28, Florence, S.C. 29501

[21] Appl. No.: 447,183

[22] Filed: Dec. 7, 1989

[51] Int. Cl.⁵ .................................................. B66F 9/06
[52] U.S. Cl. ....................................... 414/607; 294/93;
    403/322; 403/381; 224/42.07; 414/785
[58] Field of Search ............... 414/592, 607, 608, 619,
    414/662, 663, 785, 723, 686, 92; 187/9 R;
    294/93; 224/42.05, 42.07, 42.04, 42.49, 279,
    280; 403/322, 381

[56] References Cited

U.S. PATENT DOCUMENTS

| | | | |
|---|---|---|---|
| 1,716,718 | 6/1929 | Castagna | 269/242 |
| 2,195,366 | 3/1940 | Haigh | 224/42.07 X |
| 2,386,759 | 10/1945 | Ulm | 414/608 |
| 2,675,139 | 4/1954 | Mercier et al. | 414/608 |
| 2,699,269 | 1/1955 | Ulinski | 414/608 |
| 2,847,138 | 8/1958 | Backofen et al. | 414/785 |
| 2,956,701 | 10/1960 | Larson | 414/785 |
| 3,122,252 | 2/1964 | Jones | 414/785 |
| 3,269,570 | 8/1966 | Wallberg | 414/723 |
| 3,460,700 | 11/1969 | Kroupa | 414/667 |
| 3,480,167 | 11/1969 | Varilek | 414/785 |
| 3,528,580 | 9/1970 | Carliss | 414/785 |
| 3,760,883 | 9/1973 | Birk | 414/723 |
| 3,818,551 | 6/1974 | Coughran, Jr. | 414/723 |
| 4,013,182 | 3/1977 | Pratt et al. | 414/723 |
| 4,236,329 | 12/1980 | Hetrick | 414/723 X |
| 4,242,034 | 12/1980 | Schmidtz | 414/723 |
| 4,391,423 | 7/1983 | Pruett et al. | 269/242 |
| 4,607,997 | 8/1986 | Asano | 414/667 |
| 4,677,814 | 7/1987 | Anderson et al. | 172/277 |
| 4,881,867 | 11/1989 | Essex et al. | 294/93 X |
| 4,897,010 | 1/1990 | Golley | 414/607 |

Primary Examiner—Frank E. Werner
Assistant Examiner—Craig Slavin

[57] ABSTRACT

An accessory chuck for utility vehicles having an upper jaw and a lower jaw slidably suspended therefrom and movable by turning a threaded rod supported by the upper jaw. Suspending members are pivotally attached to the lower jaw and to pairs of carrying nuts that ride on the threaded rods. Turning the threaded rod from either end causes each pair of carrying nuts to ride closer or farther apart, depending on the direction the rod is turned. As the carrying nuts move, the suspending members raise or lower the lower jaw to a releasing or a gripping position, respectively.

18 Claims, 3 Drawing Sheets

CHUCK FOR ATTACHING UTILITY VEHICLE ACCESSORIES

BACKGROUND OF THE INVENTION

1. Field of the Invention

The present invention relates to utility vehicles having mechanisms for attaching accessories. More specifically, the present invention relates to a means for attaching accessories such as forks, buckets, blades, and the like, to utility vehicles.

2. Discussion of Background

In the field of utility vehicle attachment mechanisms, the selection of accessories and method for attaching them is quite varied. See for example, U.S. Pat. No. 3,269,570 issued to Wallberg, U.S. Pat. No. 4,607,997 issued to Asano, and U.S. Pat. No. 3,528,580 issued to Carliss. Of importance is the ability of the utility vehicle carriage to quickly but safely secure the accessory. Some accessory chucks, if they fail, will fail in such a way that the accessory becomes detached. In others there are no convenient means for changing the accessory without involving the operator placing his or her hands between the major component and the vehicle where injuries can occur.

There is a need for a simpler, safer, more efficient and versatile mechanism for attaching accessories to a utility vehicle.

SUMMARY OF THE INVENTION

According to the major aspects of the present invention, the accessory chuck comprises an upper jaw, a lower jaw in slidable contact with the upper jaw, and a means for moving the upper and lower jaws with respect to each other from an accessory-releasing position to an accessory-gripping position. The upper jaw is attached to the vehicle. The lower jaw, unattached, is guided into interleaved relationship with the upper jaw, raised by the moving means. The moving means comprises suspending members pulled by carrying nuts riding on a threaded rod. The rod is turned at one end of the chuck by the operator.

The accessory chuck provides ease in the attachment and removal of accessories to a utility vehicle. The accessory chuck may be backfitted to any standard utility vehicle by attaching it to the vehicle's carriage by any suitably strong attaching means, such as bolting or welding, or incorporated into an improved vehicle in lieu of the standard utility vehicle carriage. If integrated into the carriage of the vehicle, there is no loss of lift capacity or leverage. Because of simplicity of design of the accessory chuck, maintenance is simplified and operation is more efficient.

Another feature of the present invention is the full width upper and lower rails that grip the accessory. These rails do not require precise positioning of the vehicle for gripping and indeed the vehicle may want to grip the accessory in a side-shifted position.

Another feature of the present invention is its symmetry which enables an operator to raise and lower the lower jaw from either side to simplify the attachment and removal of accessories to the utility vehicle.

Yet another feature of the accessory chuck is the positive control of the gripping and release of attachments; the accessory, once in the gripping position, will not fail to the releasing position.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

Figure 1:
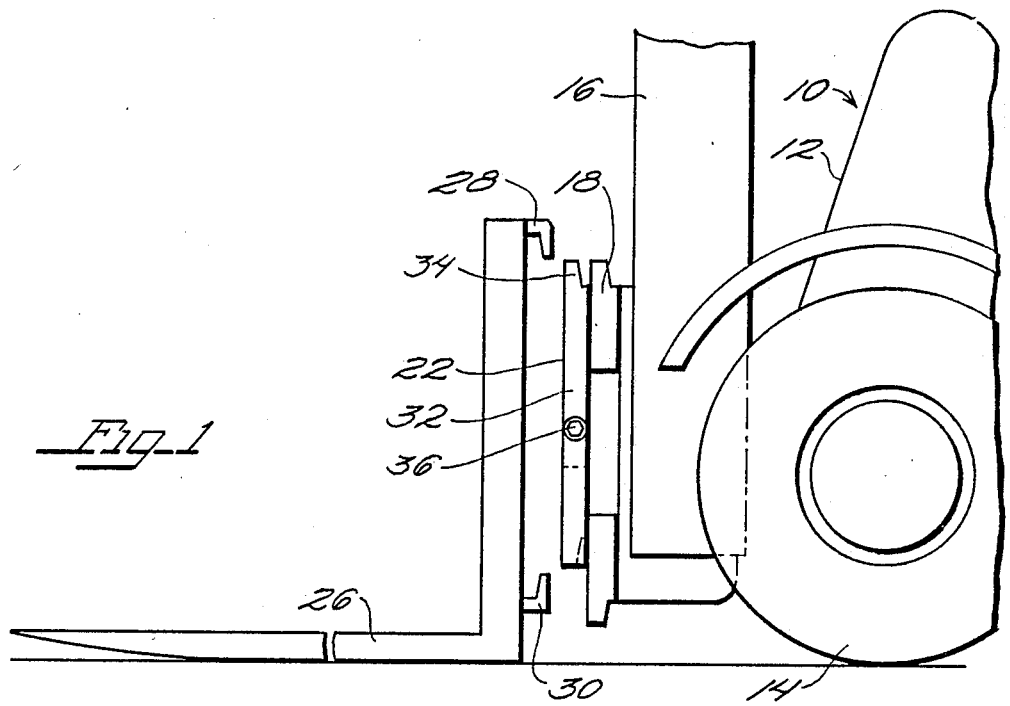
FIG. 1 is a side view of a portion of a utility vehicle disengaging a fork according to an embodiment of the present invention.

Referring now to the drawings, in FIG. 1 the front portion of a utility vehicle 10 is shown in profile with utility vehicle front 12, wheel 14, vertical member 16 and standard carriage 18. Standard carriage 18 is attached to vertical member 16 and is of the type found on many utility vehicles. Vertical member 16 has a mechanism for lifting a standard carriage 18. A chuck 22 for allowing the gripping of accessories is attached to carriage 18 in a manner described more fully below. In FIG. 1, the utility vehicle 10 is approaching an accessory 26, namely a fork as shown, with accessory chuck 22 shown in releasing position. Fork 26 has an upper hook 28 and a lower hook 30.

Accessory chuck 22 is attached to carriage 18 by bolting or welding or any rigid means of attachment when an existing utility vehicle 10 is to be backfitted with accessory chuck 22. Alternatively, carriage 18 may be eliminated in the manufacture of utility truck 10 and accessory chuck 22 fastened directly to vertical member 16. Also, although accessory chuck 22 is illustrated in the attachment of fork 26, most accessories that will fit the standard carriage 18 will fit the accessory chuck 22.

From the side view of accessory chuck 22 in FIG. 1 can be seen an upper jaw 32 with an upper rail 34 and bolt head 36. From FIG. 2, lower jaw 38 with lower rail 40 can also be seen below upper jaw 32. In the present preferred embodiment, only upper jaw 32, and not also lower jaw 38, is attached to carriage or vertical member 16 but it will be seen that the reverse arrangement will also be operative although somewhat less satisfactorily.

Figure 2:
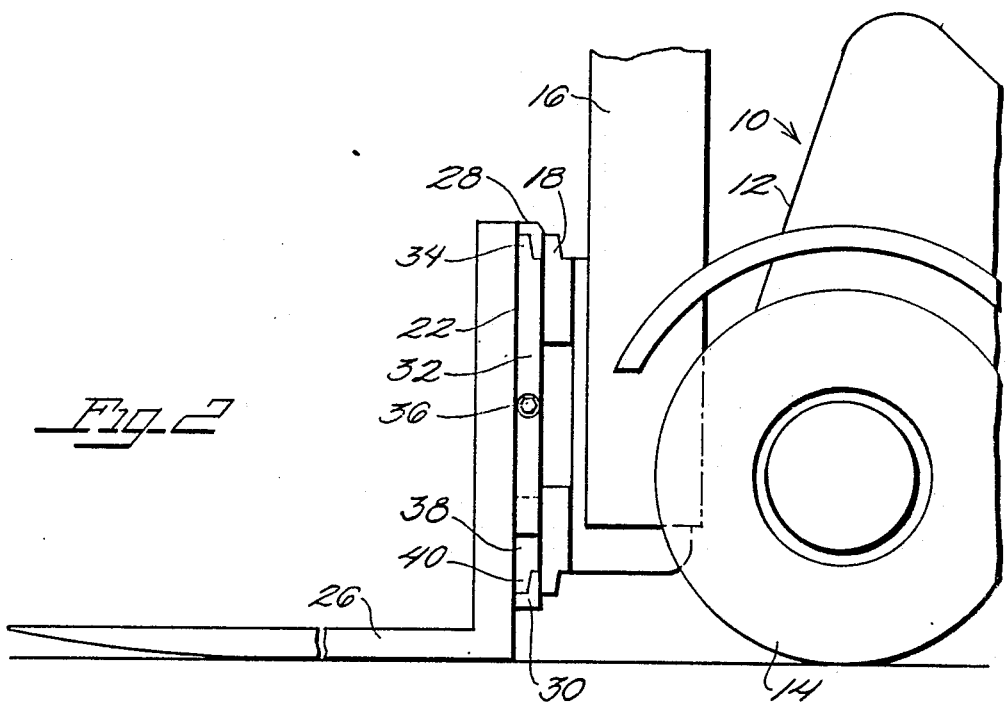
FIG. 2 is a side view of a portion of the utility vehicle of FIG. 1 according to the present embodiment with the fork engaged and locked.

In FIG. 2, utility vehicle 10 has moved slightly forward and accessory chuck 22 of utility vehicle 10 has thereby engaged fork 26, with upper rail 34 gripping the upper hook 28 and lower rail 40 gripping lower hook 30. Fork 26 is thus locked into place ready for use.

Fork 26 is locked into place by first positioning utility vehicle 10 so that accessory chuck 22 is between upper and lower hooks 28, 30, respectively, of fork 26, raising upper jaw 34 by raising carriage 18 on vertical member 16 until upper rail 34 engages upper hook 28, then turning bolt head 36 until lower rail 40 engages lower hook 30.

Figure 3:
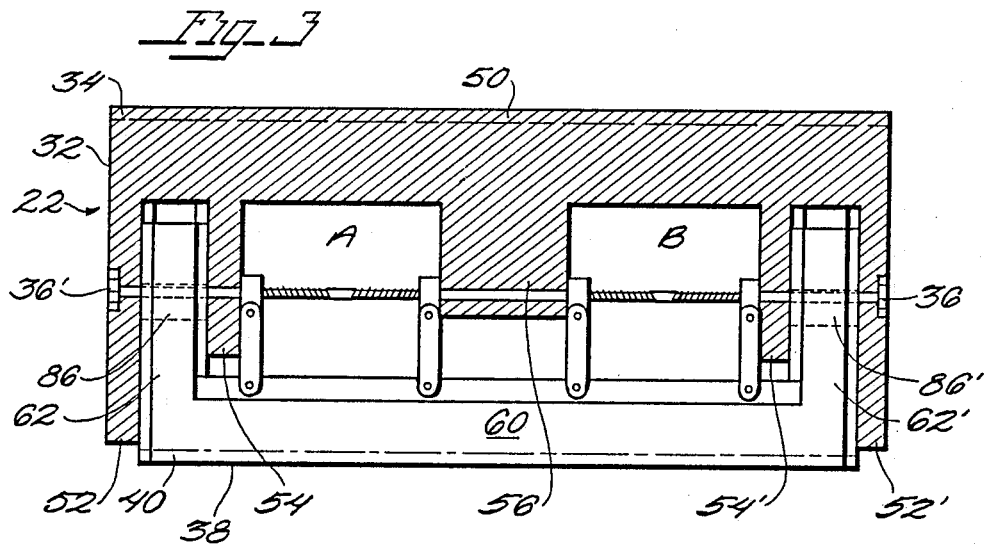
FIG. 3 is a front view of an accessory chuck in the gripping position according to the present embodiment.
Figure 4:
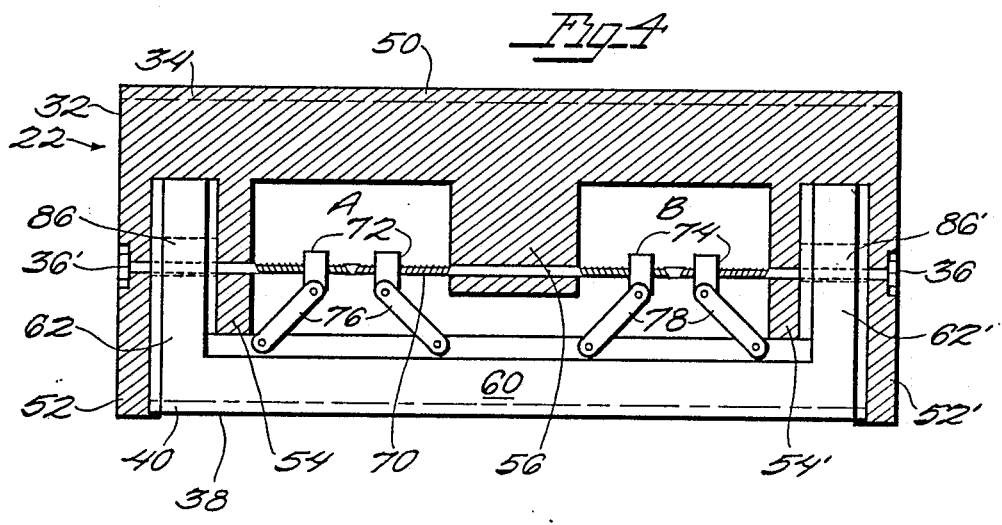
FIG. 4 is a front view of the accessory chuck in the releasing position according to the present embodiment.

Referring now to FIGS. 3 and 4, front views (which are symmetric to rear views) of accessory chuck 22 in the releasing position and the gripping position, respectively, it will be seen that chuck 22 comprises a horizontal member 50 and several spaced apart extensions depending therefrom: a left and a right jaw guide 52, 52', a left and a right interior jaw guide 54, 54' and a center jaw support 56. Lower jaw 38 comprises a horizontal member 60 and also several extensions: namely, a left and right jaw guide, 62, 62'. Left jaw guide 62 of lower jaw 38 slides vertically between left jaw guide 52 and interior jaw guide 54 of upper jaw 32, at least one face of left lower jaw guide 62 in contact with a face of left jaw guide 52 and interior jaw guide 54. Correspondingly, right jaw guide 62' of lower jaw 38 slides vertically between right jaw guide 52' and right interior jaw guide 54' of upper jaw 32, at least one face of right lower jaw guide 62' in contact with a face of right jaw guide 52' and right interior jaw guide 54'. Upper rail 34 runs the length of horizontal member 50 of upper jaw 32; lower rail 40 runs the length of horizontal member 60 of lower jaw 38. Between left interior jaw guide 54 and center jaw support 56 is defined a first space A; between right interior jaw guide 54' and center jaw support 56 is a second space B.

Figure 5:
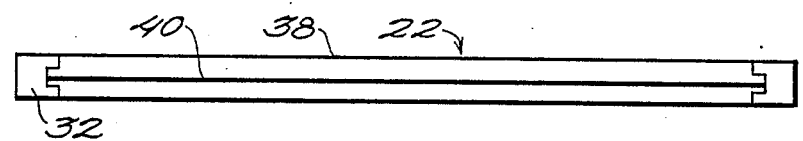
FIG. 5 is a bottom view of the accessory chuck according to the present embodiment.

Helping to guide the sliding of lower jaw 38 with respect to upper jaw 32 are tongue-and-groove interconnections, as best seen in FIG. 5, where lower jaw 38 is shown as having the "tongue" and upper jaw 32 having the "groove", but it will be apparent that the reverse arrangement is equivalent to that shown.

Figure 6:
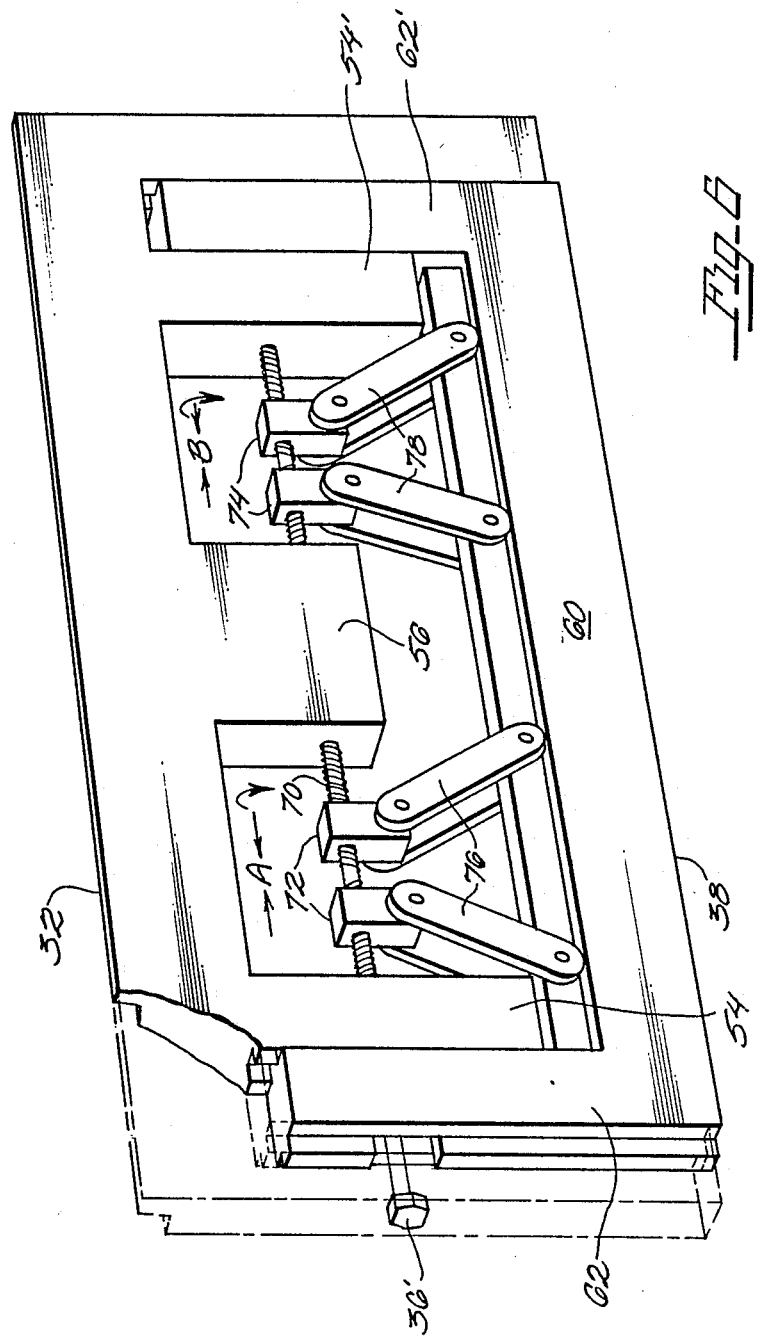
FIG. 6 is a perspective, detailed view of the means for moving the lower jaw of an accessory chuck according to the present embodiment.

The mechanism for moving the upper and lower jaws 32, 38, with respect to each other comprises a threaded rod 70 having two pair of carrying nuts 72, 74 riding thereon and two pair of suspending members 76, 78 (each suspending member is in duplicate on each carrying nut as seen in FIG. 6) pivotally connecting the carrying nuts 72, 74 and lower jaw 38.

Rod 70 extends the width of upper jaw 32, passing through holes in left jaw guide 52, left interior jaw guide 54, center jaw support 56, right interior jaw guide 54' and right jaw guide 52'. Rod 70 passes through slots 86, 86' in left and right jaw guide 62, 62', respectively, of lower jaw 38. Rod 70 will be toward the bottom of slots 86, 86' of left and right jaw guides 62, 62' of lower jaw 38 when chuck is in the releasing position (FIG. 4) and toward the top of slots 86, 86' when chuck is in the gripping position (FIG. 3). Rod 70 terminates at the right end in bolt head 36 and the left end in bolt head 36'. Turning bolt head 36 or bolt head 36' will operate accessory chuck 22.

In spaces A and B are arranged carrying nuts 72, 74 and suspending members 76, 78. As seen in FIG. 6, rod 70 in these regions has zones of left and right hand threads. The portion of rod 70 in Space A has right hand threads on the left half of that portion and left hand threads on the right hand portion. Similarly, in Space B, the left half of the portion of rod 70 has right hand threads and the right half of the portion has left hand threads. As rod 70 is turned clockwise, first pair of carrying nuts 72 will ride toward each other and second pair of carrying nuts 74 will ride toward each other (FIG. 6). Turning rod 70 counterclockwise will cause first and second pair of carrying nuts 72, 74 to ride apart. It will be apparent that a reverse arrangement of threads will work in an equivalent manner to that shown. As carrying nuts 72, 74 move, suspending members 76, 78 are free to pivot about their respective attachments to carrying nuts 72, 74 and horizontal member 60 of lower jaw 38. At the point of extreme separation of carrying nuts 72, 74, suspending members 76, 78 hang straight down and lower jaw 38 has slid vertically downward to its gripping position. As carrying nuts 72, 74 move closer together, they pull one end of suspending members 76, 78 horizontally as the other end, the end pivotally attached to horizontal member 60, remains in place. Thus, lower jaw 38 is thereby lifted. Lower jaw 38 is limited in its movement by the length of interior jaw guides 54, 54' which stop upward movement of horizontal member 60 of lower jaw 38, as shown in FIG. 4.

Accessory chuck 22 is preferably made of steel or other durable material of suitable thickness, preferably approximately one and one-half inches thick. The upper and lower jaws 32, 38, are preferably made of a single piece of material, milled to tolerance. A hydraulic connection to bolt heads 36, 36' can be made to allow remote release and gripping of accessories. If done remotely, it is preferable to incorporate limit switches to verify the accessory is in the gripping position.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiment and with various modifications as are suited to the particular use contemplated. It is intended that the scope of the invention be defined by the claims appended hereto.

What is claimed is:

1. An accessory chuck for releasably gripping attachments used with a utility vehicle, comprising:
   a upper jaw, and
   a lower jaw in slidable contact with said upper jaw; and
   means for moving said jaws vertically with respect to each other to a gripping position from a releasing position, said upper and lower jaws holding said attachments firmly when in said gripping position, wherein said lower jaw has a horizontal member with a plurality of vertical spaced-apart extensions integral with said horizontal member and said upper jaw has a horizontal member with a plurality of spaced-apart extensions depending from and integral with said horizontal member, said extensions of said upper jaw interleaving with said extensions of said lower jaw, one face of each extension of said upper jaw extension engaging one face of each extension of said lowering jaw.

2. An accessory chuck as recited in claim 1, wherein said moving means further comprises:
   a rod rotatably supported by said upper jaw; and
   means for suspending said lower jaw from said rod so that said lower jaw can be moved vertically with respect to said rod as said rod is turned.

3. An accessory chuck as recited in claim 2, wherein said rod is a horizontal threaded rod and said suspending means is carried by the threads of said threaded rod as said threaded rod is turned.

4. An accessory chuck as recited in claim 3, wherein said threaded rod has zones of left- and right-hand threads and said suspending means further comprises:
   one or more pair of carrying nuts threadably carried on said threaded rod, each of said pair of carrying nuts moving together when said threaded rod is turned in a first direction and apart when said threaded rod is turned in an opposing direction; and
   one or more pair of suspending members pivotally connected to said carrying nuts and to said lower jaw, one suspending member attached to one carrying nut, so that said lower jaw is moved upwardly as said carrying nuts move closer together and downwardly as said carrying nuts move apart.

5. An accessory chuck as recited in claim 3, wherein at least one end of said threaded rod is turnable.

6. An accessory chuck as recited in claim 4, having two pair of suspending members, two pair of carrying nuts, and two zones of left and right threads.

7. An accessory chuck as recited in claim 1, wherein said accessory chuck further comprises a means for guiding said lower jaw with respect to said upper jaw so that movement of said lower jaw is in the vertical direction and not in a lateral direction with respect to said upper jaw.

8. An accessory chuck as recited in claim 7, wherein said faces of said upper and lower jaw extensions have tongue-and-groove interconnections.

9. A utility vehicle for use with accessories comprising:
   a vehicle having a front;
   means for lifting, said lifting means mounted to said front of said vehicle; and
   an accessory chuck attached to said lifting means and having
      an upper jaw;
      a lower jaw in slidable contact with said upper jaw; and
      means for moving said jaws vertically with respect to each other to a gripping position from a releasing position, said upper and lower jaws holding said accessories firmly when in said gripping position, said moving means having
         a rod rotatably supported by said upper jaw and means for suspending said lower jaw from said rod so that said lower jaw can be moved vertically with respect to said rod as said rod is turned.

10. A utility vehicle as recited in claim 9, wherein said rod is horizontal threaded rod and said suspending means is carried by the threads of said threaded rod as said threaded rod is turned.

11. A utility vehicle as recited in claim 10, wherein said threaded rod has zones of left- and right-handed threads and said suspending means further comprises:
   one or more pair of carrying nuts threadably carried on said threaded rod, each of said pair of carrying nuts moving together when said threaded rod is turned in a first direction and apart when said threaded rod is turned in an opposing direction; and
   one or more pair of suspending members pivotally connected to said carrying nuts and to said lower jaw, one suspending member attached to one carrying nut, so that said lower jaw is moved upwardly as said carrying nuts move closer together and downwardly as said carrying nuts move apart.

12. A utility vehicle as recited in claim 10, wherein said threaded rod is turnable by mechanical means at least one end of said rod.

13. A utility vehicle as recited in claim 10, wherein at least one end of said threaded rod is turnable.

14. A utility vehicle as recited in claim 11, having two pair of suspending members, two pair of carrying nuts, and two zones of left and right threads.

15. A utility vehicle as recited in claim 9, wherein said accessory chuck further comprises a means for guiding said lower jaw with respect to said upper jaw so that movement of said lower jaw is in the vertical direction and not in a lateral direction with respect to said upper jaw.

16. A utility vehicle as recited in claim 9, wherein said lower jaw further comprises a horizontal member with a plurality of vertical spaced-apart extensions integral with said horizontal member and said upper jaw further comprises a horizontal member with a plurality of spaced apart extensions depending from and integral with said horizontal member, said extensions of said upper jaw interleaving with said extensions of said lower jaw, one face of each extension of said upper jaw extension engaging one face of each extension of said lower jaw.

17. A combination as recited in claim 16, wherein said faces of said upper and lower jaw extensions have tongue-and-groove interconnections.

18. An accessory chuck for releasably gripping attachments used with a utility vehicle, comprising:
   a upper jaw;
   a lower jaw in slidable contact with said upper jaw; and
   means for moving said jaws vertically with respect to each other to a gripping position from a releasing position, said upper and lower jaws holding said attachments firmly when in said gripping position, said moving means having
      a rod rotatably supported by said upper jaw, and means for suspending said lower jaw from said rod so that said lower jaw can be moved vertically with respect to said rod as said rod is turned, wherein said rod is a horizontal threaded rod and said suspending means is carried by the threads of said threaded rod as said threaded rod is turned.

* * * * *